US011979524B2

(12) United States Patent
Nakajima

(10) Patent No.: US 11,979,524 B2
(45) Date of Patent: May 7, 2024

(54) IMAGE FORMING DEVICE THAT DISPLAYS TWO-DIMENSIONAL CODE THAT ENABLES ACCESS TO DOCUMENT DATA STORED IN CLOUD SERVER, NON-TRANSITORY COMPUTER-READABLE STORAGE MEDIUM STORING IMAGE FORMING PROGRAM, AND MOBILE INFORMATION TERMINAL

(71) Applicant: SEIKO EPSON CORPORATION, Tokyo (JP)

(72) Inventor: Norihiko Nakajima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/067,751

(22) Filed: Dec. 19, 2022

(65) Prior Publication Data
US 2023/0199124 A1 Jun. 22, 2023

(30) Foreign Application Priority Data

Dec. 20, 2021 (JP) ................. 2021-205747

(51) Int. Cl.
*H04N 1/00* (2006.01)
*H04N 1/32* (2006.01)

(52) U.S. Cl.
CPC ..... *H04N 1/00244* (2013.01); *H04N 1/00217* (2013.01); *H04N 1/32122* (2013.01); *H04N 1/32358* (2013.01); *H04N 1/00225* (2013.01); *H04N 1/00233* (2013.01); *H04N 2201/0094* (2013.01); *H04N 2201/3269* (2013.01); *H04N 2201/3273* (2013.01)

(58) Field of Classification Search
None
See application file for complete search history.

(56) References Cited

U.S. PATENT DOCUMENTS

| | | | |
|---|---|---|---|
| 7,603,409 B2* | 10/2009 | Kobayashi | G06F 16/9577 715/838 |
| 9,860,413 B2* | 1/2018 | Panda | H04N 1/4413 |
| 2003/0077064 A1* | 4/2003 | Katayama | H04N 1/00137 348/231.1 |

(Continued)

FOREIGN PATENT DOCUMENTS

| | | |
|---|---|---|
| JP | 2014-120975 A | 6/2014 |
| JP | 2017-162368 A | 9/2017 |
| JP | 2021-022123 A | 2/2021 |

*Primary Examiner* — Miya J Cato
*Assistant Examiner* — Pawan Dhingra
(74) *Attorney, Agent, or Firm* — Global IP Counselors, LLP

(57) ABSTRACT

An image forming device includes: a scanner section; a print section; an operation panel; a communication section configured to communicate with a cloud server; and a controller, wherein the controller transmits document data scanned by using the scanner section to the cloud server and causes the cloud server to store the document data in storage in accordance with an operation performed on the operation panel, and when the document data is specified in accordance with data identifying the document data kept in the storage of the cloud server in accordance with an operation performed on the operation panel, the controller displays a two-dimensional code enabling access to the document data stored in the storage of the cloud server.

6 Claims, 7 Drawing Sheets

(56) References Cited

U.S. PATENT DOCUMENTS

| | | | |
|---|---|---|---|
| 2007/0019232 A1* | 1/2007 | Kano | H04N 1/00968 |
| | | | 358/1.15 |
| 2008/0112022 A1* | 5/2008 | Masao | H04N 1/32122 |
| | | | 358/506 |
| 2014/0168696 A1* | 6/2014 | Matsuhara | H04N 1/00307 |
| | | | 358/1.14 |
| 2016/0246554 A1* | 8/2016 | Yasuda | G06F 3/1292 |
| 2017/0264616 A1* | 9/2017 | Maruyama | G06F 21/608 |
| 2018/0124272 A1* | 5/2018 | Panda | H04N 1/32133 |
| 2019/0327240 A1 | 10/2019 | Maruyama | |
| 2021/0029101 A1* | 1/2021 | Igari | G06K 7/1417 |
| 2021/0042724 A1* | 2/2021 | Rathod | G07G 1/0054 |
| 2022/0036678 A1* | 2/2022 | Parekh | G06V 40/107 |
| 2023/0419775 A1* | 12/2023 | McGlothen | G07F 17/3258 |

* cited by examiner

IMAGE FORMING DEVICE THAT DISPLAYS TWO-DIMENSIONAL CODE THAT ENABLES ACCESS TO DOCUMENT DATA STORED IN CLOUD SERVER, NON-TRANSITORY COMPUTER-READABLE STORAGE MEDIUM STORING IMAGE FORMING PROGRAM, AND MOBILE INFORMATION TERMINAL

The present application is based on, and claims priority from JP Application Serial Number 2021-205747, filed Dec. 20, 2021, the disclosure of which is hereby incorporated by reference herein in its entirety.

BACKGROUND

1. Technical Field

The present disclosure relates to an image forming device capable of communicating with an external cloud server, a non-transitory computer-readable storage medium storing an image forming program, and a mobile information terminal.

2. Related Art

In JP-A-2014-120975, a mobile information terminal notifies an information processing apparatus (multifunction printer) of access information for connecting to a server that provides cloud services by running a remote operation application installed on the mobile information terminal. The information processing apparatus then transmits screen data of an operation screen to the mobile information terminal, and the mobile information terminal displays the received screen data.

When an operation is performed on the mobile information terminal in accordance with the received screen data, the information processing apparatus is notified of the operation, and the information processing apparatus performs the corresponding processing. JP-A-2017-162368 discloses a technique by which a document is transmitted from a document storage device to an image processing apparatus. In JP-A-2021-22123, when an error occurs, information for connecting to a support site is displayed on a display in a displayable size.

When a mobile information terminal performs a remote operation on an information processing apparatus, it is possible for the information processing apparatus to perform the corresponding processing. However, it has not been possible to directly connect a cloud server and a mobile information terminal to each other. The information processing apparatus that stores a document in the cloud and a mobile information terminal used to browse the document are separate devices, and there is thus no mechanism for the information processing apparatus to provide the mobile information terminal with the location of the document in the cloud. Accordingly, it has been difficult for the mobile information terminal to easily access the document.

SUMMARY

It is an object of the present disclosure to enable a mobile information terminal to easily access a document in a cloud service.

According to an aspect of the present disclosure, there is provided an image forming device including: a scanner section; a print section; an operation panel configured to display and receive an input operation; a communication section configured to communicate with an external cloud server; and a controller, wherein the controller transmits document data scanned by using the scanner section to the cloud server and causes the cloud server to store the document data in storage in accordance with an operation performed on the operation panel, and when the document data is specified in accordance with data identifying the document data kept in the storage of the cloud server in accordance with an operation performed on the operation panel, the controller displays a two-dimensional code that enables access to the document data stored in the storage of the cloud server.

In the configuration described above, the controller transmits the scanned document data to the cloud server by using the scanner section and causes the cloud server to store the document data in the storage in accordance with the operation performed on the operation panel. Also, when document data is specified in accordance with data identifying the document data kept in the storage of the cloud server, the controller displays a two-dimensional code that enables access to the document data stored in the storage of the cloud server in accordance with the operation performed on the operation panel.

DESCRIPTION OF EXEMPLARY EMBODIMENTS

First Embodiment

Figure 1:
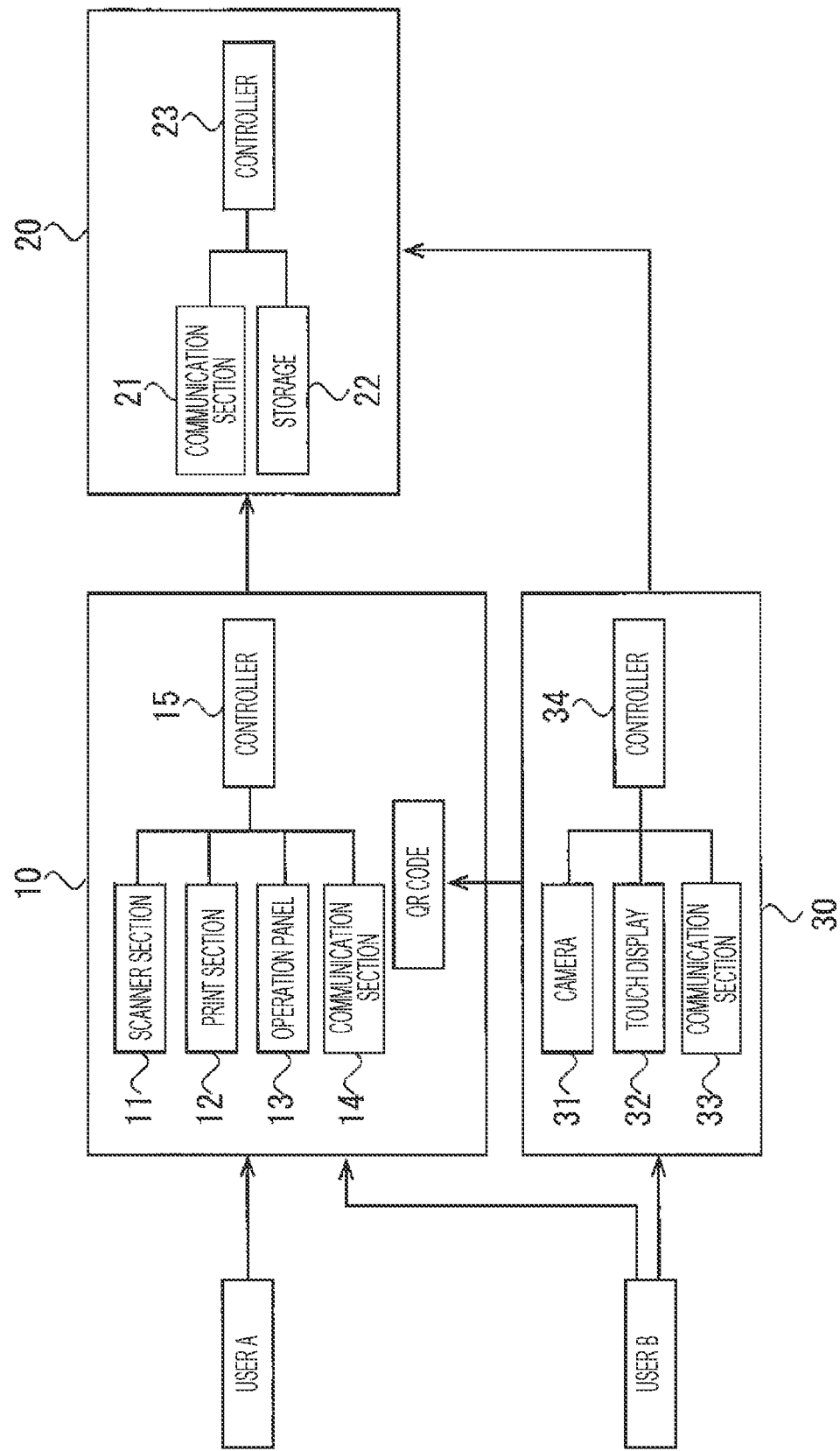
FIG. 1 is a schematic configuration diagram of a cloud-based document system including a multifunction printer to which an image forming device according to the present disclosure is applied.

In the following, a description will be given of an embodiment according to the present disclosure with reference to the drawings. FIG. 1 illustrates the schematic configuration of a cloud-based document system including a multifunction printer to which an image forming device according to the present disclosure is applied. In FIG. 1, the multifunction printer 10 is able to communicate with a cloud server 20 via the Internet and is able to upload or download document data to or from the cloud server 20. The mobile information terminal 30 is capable of communicating with the cloud server 20 via the Internet and is able to download document data from the cloud server 20 or cause the multifunction printer 10 to download document data and to print the document data.

The multifunction printer 10 mainly includes components such as a scanner section 11, a print section 12, an operation panel 13, a communication section 14, a controller 15, and the like. The scanner section 11 scans and converts a document on a document stand into image data. The print section 12 prints characters, patterns, and the like on a print medium. The operation panel 13 includes a touch display, a physical switch, and the like, displays an operation screen for a user, and outputs an operation signal corresponding to a user operation. The communication section 14 is able to connect to a network, communicates with the cloud server 20 via the network, uploads and downloads document data including image data, and transmits and receives various kinds of accompanying data. The controller 15 executes a control program described later so as to control each of the components 11 to 14 to perform predetermined processing.

The cloud server 20 mainly includes a communication section 21, storage 22, a controller 23, and the like. The communication section 21 is able to connect to a network, communicates with the multifunction printer 10 via the network, uploads and downloads document data including image data, and transmits and receives various kinds of accompanying data. The storage 22 stores various kinds of data including document data. The controller 23 executes a control program described later so as to control each of the components 21 and 22 to perform predetermined processing.

The mobile information terminal 30 mainly includes a camera 31, a touch display 32, a communication section 33, a controller 34, and the like. The camera 31 generates image data corresponding to a subject. For example, the camera captures an image of a two-dimensional code, such as a QR code (registered trademark), or the like to output the code as image data. The touch display 32 is able to display an image and receive input of a touch position on the image. The communication section 33 is able to perform communication in accordance with a plurality of standards and is able to communicate with the multifunction printer 10 and the cloud server 20 via a network as an example. The controller 34 executes a control program described later so as to control each of the components 31 to 33 to perform predetermined processing.

Next, a description will be given of the operation of the present embodiment having the configuration described above. It is possible to use the multifunction printer 10 in various ways. In one of the ways, the multifunction printer 10 scans a document to produce document data and then saves the document data on a cloud server connected via a network. This way of use is referred to as "scan to cloud processing". To perform scan to cloud processing, select "scan to cloud" by touching the menu displayed on the operation panel 13 of the multifunction printer 10. It is assumed here that a user A performs an operation to select "scan to cloud".

Figure 2:
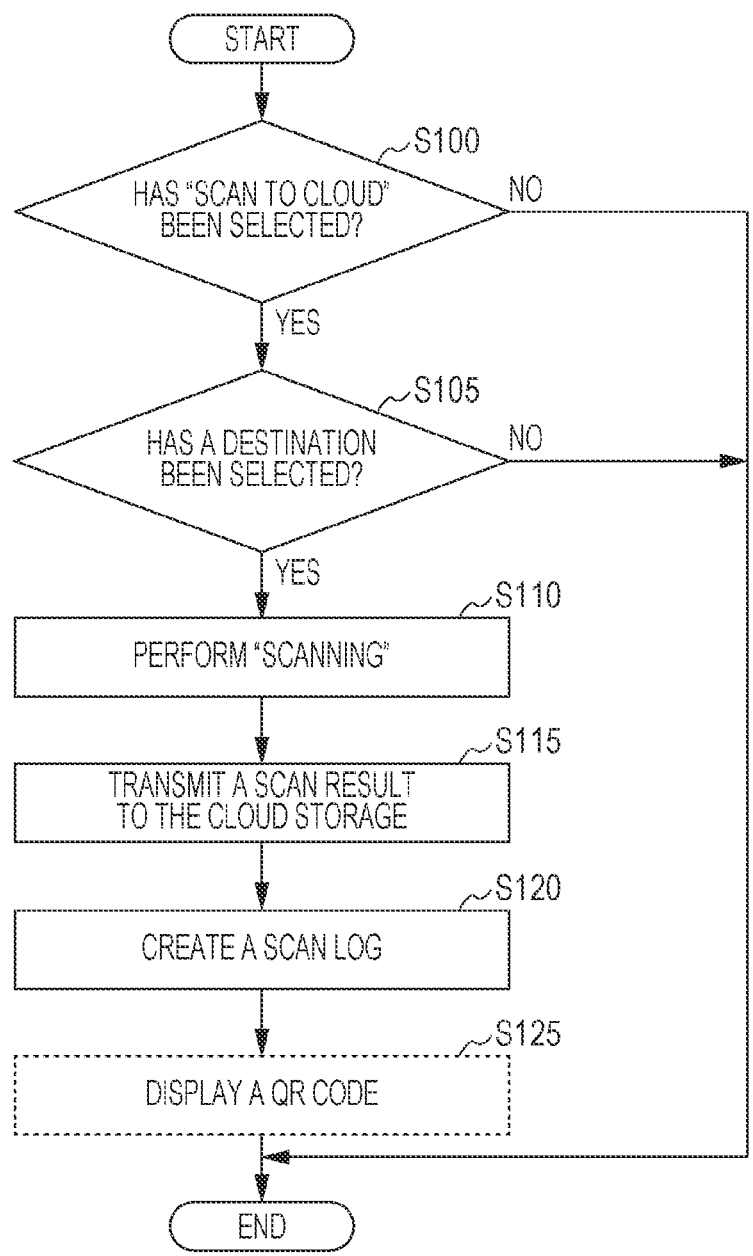
FIG. 2 is a flowchart corresponding to a control program executed by the multifunction printer.

FIG. 2 is a flowchart of the control program executed by the multifunction printer 10. In the multifunction printer 10, the controller 15 outputs a control signal for controlling display of the operation panel 13 and receives input of a detection signal indicating a touch operation performed on the operation panel 13. When the controller 15 determines that "scan to cloud" has been selected in accordance with the detection signal of the operation panel 13 in step S100, the controller 15 determines whether or not a selection operation of destination selection has been received in step S105. The destination selection is performed by displaying connectable cloud servers 20 on the operation panel 13 so that a user is able to select a cloud server 20 on the network, and the controller 15 identifies a cloud server 20 to be a storage destination of the document data by receiving input of a detection signal indicating a selection result of a cloud server 20 from a user. When a destination is selected, the controller 15 scans a document on a document stand to generate document data in step S110. Next, in step S115, the controller 15 controls the communication section 14 to transmit the generated document data, which is the scan result, to the storage 22 of the cloud server 20. The communication section 14 logs in to the cloud server 20 via the network, and after login, uploads the document data to the cloud server 20. Finally, in step S120, the controller 15 records a scan log that identifies the selected destination cloud server 20 and the uploaded document data. Also, the controller 15 is able to create thumbnail data of the document data and save the thumbnail data.

Figure 3:
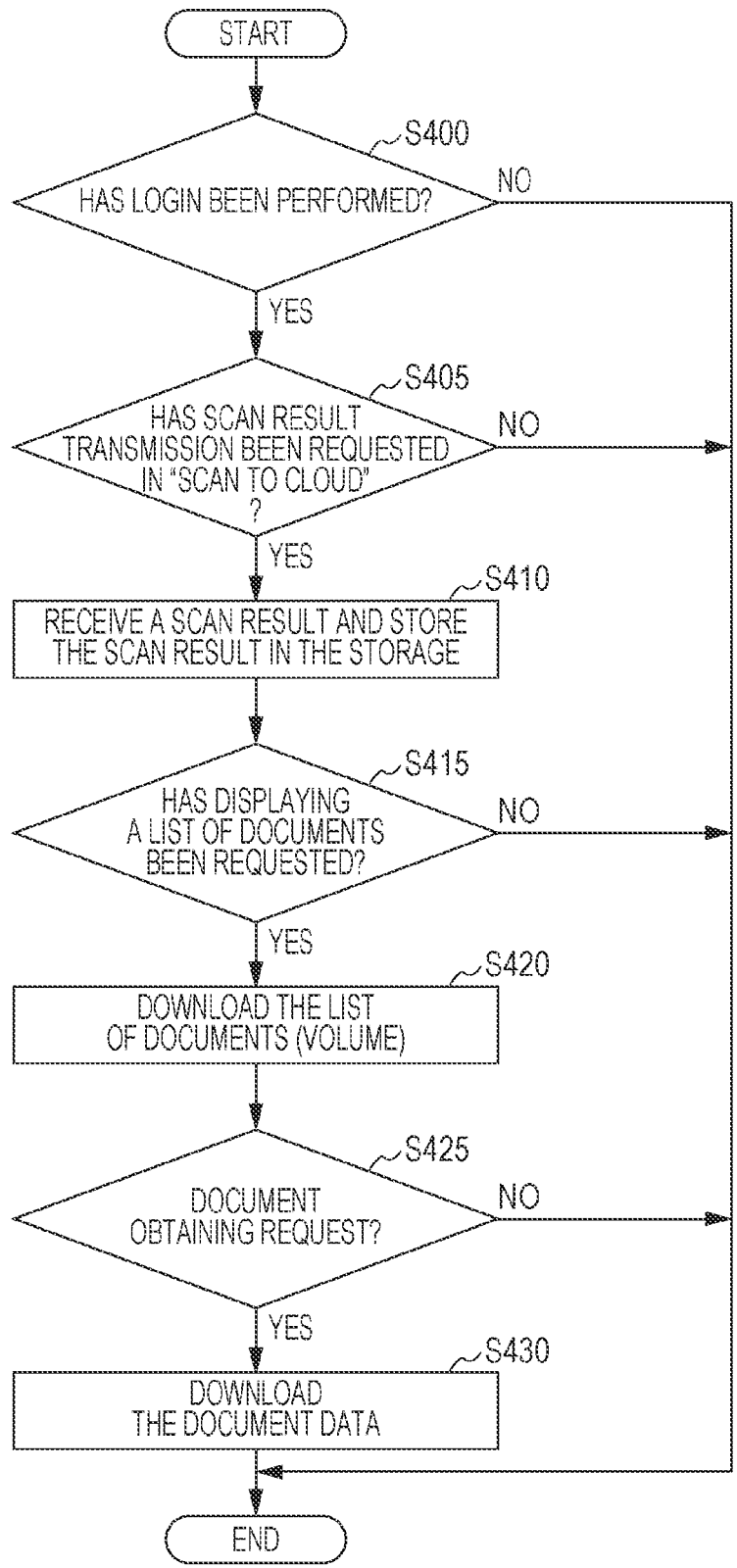
FIG. 3 is a flowchart corresponding to a control program executed by a cloud server.

FIG. 3 is a flowchart of the control program executed by the cloud server 20. The transmission destination of the scan to cloud processing determined by the controller 15 is the cloud server 20, and thus the cloud server 20 performs the corresponding processing. The controller 23 of the cloud server 20 receives the result of login processing in step S400, and when the login operation is successful, the controller 23 determines that a login operation has occurred. After determination of a login, the controller 23 waits for a request from a login terminal. When the controller 23 determines that a transmission request of a scan result in scan to cloud processing has been received in step S405, in step S410, the controller 23 receives document data, which is a scan result, and stores the document data in the storage 22. This processing corresponds to the reception processing of document data transmitted from the communication section 14 of the multifunction printer 10 in step S115.

As described above, it is possible to realize scan to cloud processing through the combination of the multifunction printer 10 and the cloud server 20. Also, the cloud server 20 is able to store document data through the same operation performed by a user other than the user A. More specifically, the controller 15 transmits the document data scanned by using the scanner section 11 in accordance with the operation performed on the operation panel 13 to the cloud server 20 and stores the document data in the storage 22.

Figure 4:
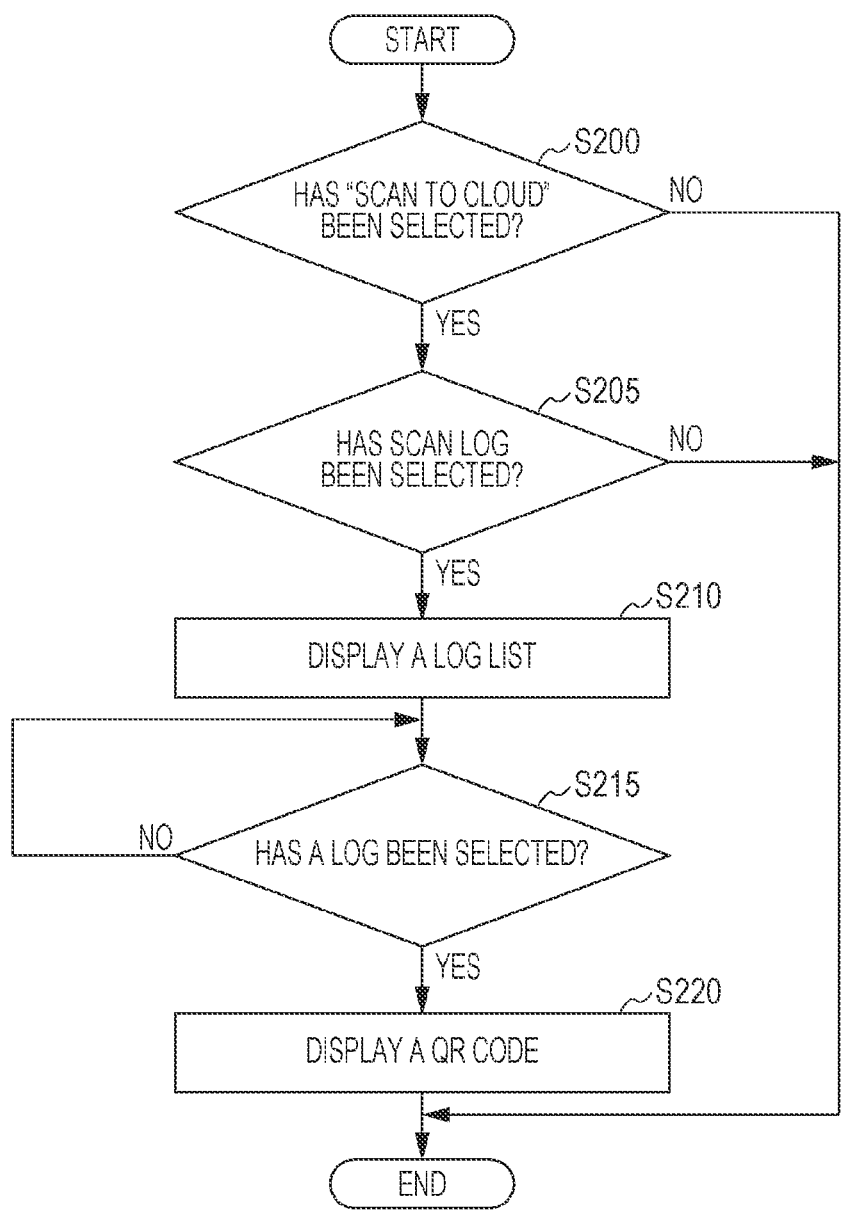
FIG. 4 is a flowchart corresponding to a control program executed by the multifunction printer.

Next, a description will be given of the processing in which a user B obtains document data stored on the cloud server 20. FIG. 4 is a flowchart of the control program executed by the multifunction printer 10. When the controller 15 determines that "scan to cloud" has been selected in accordance with the detection signal of the operation panel 13 in step S200, the controller 15 determines whether or not the scan log selection operation has been performed in step S205. The scan log selection corresponds to identifying the document data uploaded by the user B via the multifunction printer 10 in accordance with the uploaded log. Accordingly, the controller 15 displays a log list based on the created scan log in step S210.

In this manner, the controller 15 obtains data identifying the document data stored in the storage 22 of the cloud server 20 in accordance with the operation performed on the operation panel 13 and causes display data identifying the obtained document data to be displayed on the operation panel 13. At this time, thumbnails based on the thumbnail data included in the scan log may be displayed to make it easy to identify document data. The controller 15 waits for a user to perform a selection operation in step S215, and when the selection operation is performed, the controller 15 displays a two-dimensional code identifying the cloud server 20 and the document data, which are recorded in the selected log displayed on the operation panel 13 in step S220.

The two-dimensional code includes a URL address of the cloud server 20, a document data ID, and the like. The two-dimensional code may be generated in accordance with various standards. For example, it is possible to use a general QR code. In this manner, the controller 15 includes information indicating the location of document data stored in the storage 22 of the cloud server 20 as the contents of the two-dimensional code.

By the processing described above, when document data is specified in accordance with the data identifying document data stored in the storage 22 of the cloud server 20, the controller 15 displays a two-dimensional code that enables access to the document data stored in the storage 22 of the cloud server 20 in accordance with the operation performed on the operation panel 13.

In this example, displaying a two-dimensional code is triggered by the operation performed on the operation panel 13. However, the controller 15 may display the QR code of the two-dimensional code indicating the location information of the document data and the cloud server 20 in step S125, as indicated by a broken line in FIG. 2. That is to say, when the controller 15 transmits document data scanned by using the scanner section 11 to the cloud server 20 and causes the document data to be stored in the storage 22, the controller 15 is able to display a two-dimensional code that enables access to the document data stored in the storage of the cloud server 20.

Figure 5:
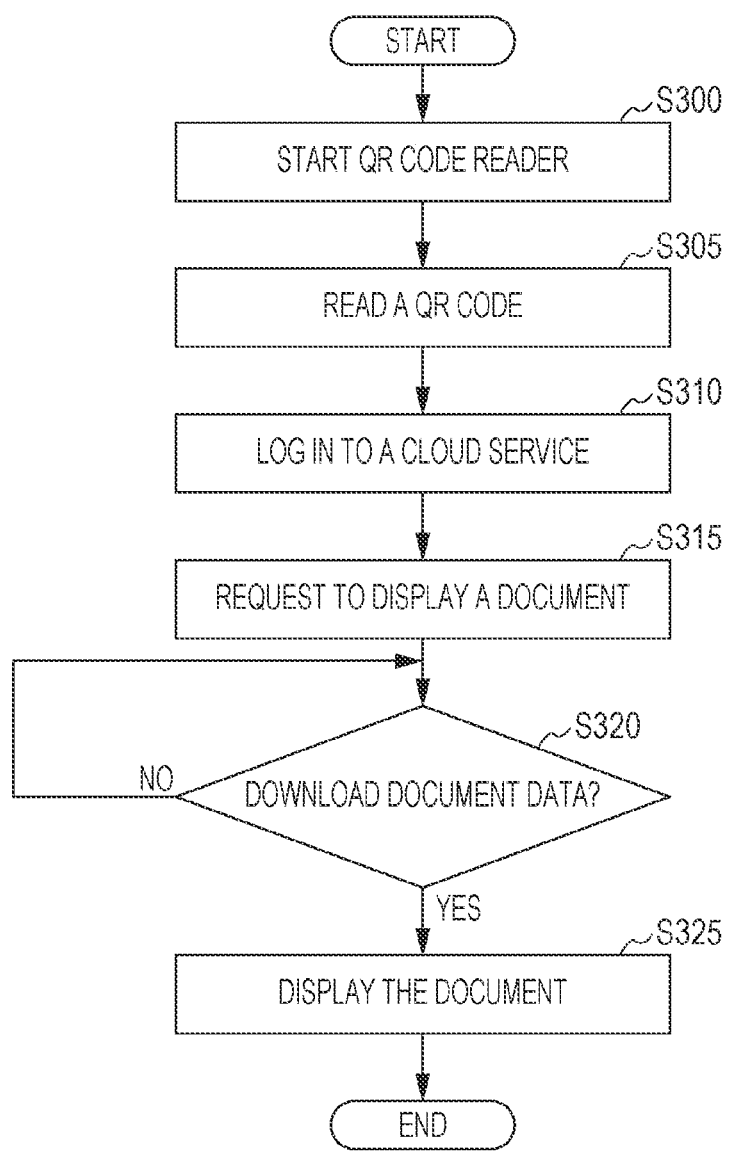
FIG. 5 is a flowchart corresponding to a control program executed by an external mobile information terminal.

Next, the user B reads the two-dimensional code displayed on the operation panel 13 by using the mobile information terminal 30 to display the two-dimensional code. FIG. 5 is a flowchart of the control program executed by the external operation terminal device. The mobile information terminal 30 waits for an input operation to be performed while the controller 34 controls the display of the touch display 32. The user B activates the two-dimensional code reader for reading the two-dimensional code. Specifically, when the QR code reader is activated in step S300, the controller 34 reads the QR code in step S305. In reading a QR code, the controller 34 activates the camera 31 to capture an image and performs processing to search the captured image data for a QR code.

When the controller 34 has located the QR code, the controller 34 controls the communication section 33 to access the cloud server 20 by using the URL address and the document data ID, which are the contents of the QR code. In general, access to the cloud server 20 is not public, and accordingly, to log in to the cloud server 20, a user is to be authorized in advance. Accordingly, when a user accesses the cloud server 20, the controller 34 logs in to the cloud service in step S310, and the user then requests the document to be displayed in step S315. In this regard, the processing is automatically performed because the document data ID is accompanied by the URL data when the mobile information terminal 30 establishes a connection to the cloud server 20 in accordance with the QR code.

On the other hand, in FIG. 3, the cloud server 20 is waiting for a login operation to be performed as described above, and when it is determined that a login operation has been performed, the cloud server 20 determines the nature of the request received from the login terminal. When the mobile information terminal 30 specifies document data, the controller 23 determines that the request is a document acquisition request in step S425 and allows the document data to be downloaded in step S430. The controller 34 of the mobile information terminal 30 waits for document data to be downloaded in step S320, and when the download is completed, the controller 34 displays the document data on the touch display 32 in accordance with the downloaded document data in step S325.

Second Embodiment

Figure 6:
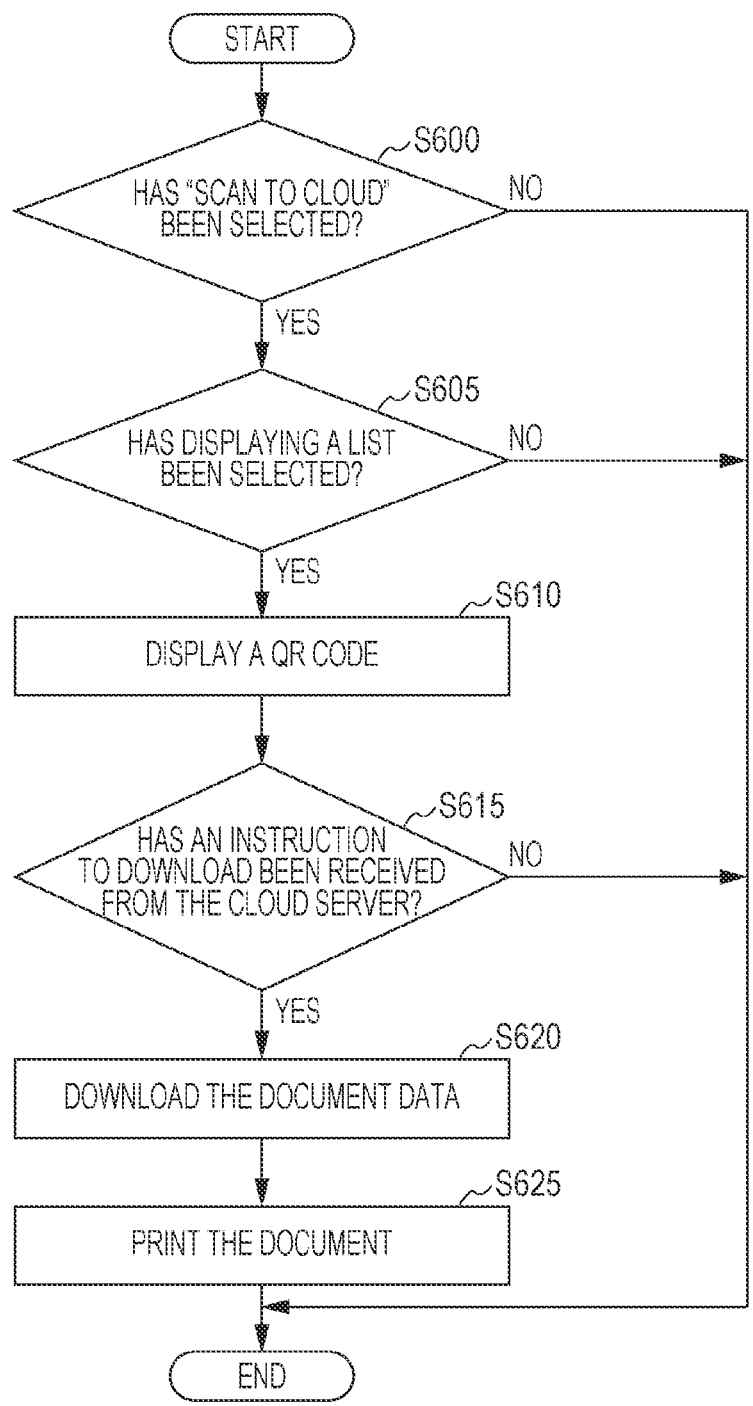
FIG. 6 is a flowchart corresponding to a control program executed by the multifunction printer.
Figure 7:
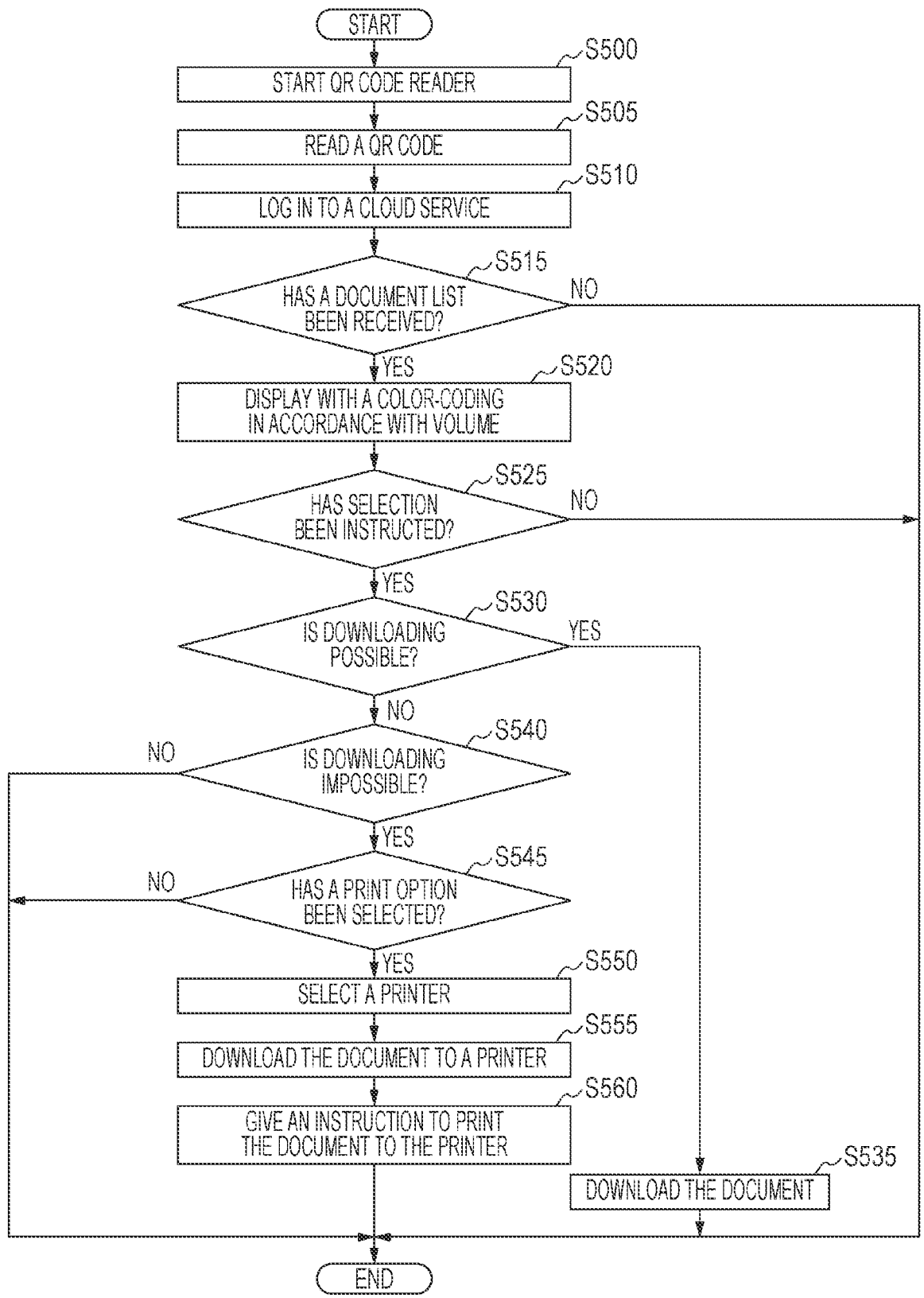
FIG. 7 is a flowchart corresponding to a control program executed by an external mobile information terminal.

FIG. 6 is a flowchart corresponding to a control program executed by the multifunction printer 10. FIG. 7 is a flowchart corresponding to a control program executed by the external mobile information terminal 30.

In the present embodiment, the mobile information terminal 30 requests the cloud server 20 to list display document data. The user B causes the multifunction printer 10 to display a two-dimensional code for accessing the cloud server 20. Specifically, the controller 15 of the multifunction printer 10 waits for an operation to be performed on the operation panel 13 by the user and determines that "scan to cloud" is selected in step S600. The user selects a list display from the scan to cloud processing for accessing the cloud server 20. When the controller 15 determines that "display document list" is selected as the next operation in step S605, the controller 15 displays the QR code in step S610. The QR code is included in the contents requesting the document list to be displayed with the URL address of the cloud server 20.

When the QR code is displayed, the user B operates the mobile information terminal 30 to instruct the QR code to be read. In the mobile information terminal 30, the controller 34 starts the QR code reader in step S500 and reads the QR code in step S505. As described above, the controller 34 performs processing to search the captured image data for the QR code. When the controller 34 locates the QR code, the controller 34 controls the communication section 33 in step S510 and accesses the cloud server 20 corresponding to the URL address included in the contents of the QR code. At this time, display of the document list is requested from the cloud server 20. After the controller 34 logs in to the cloud service in step S510, the controller 34 waits for the document list to be displayed in step S515.

Referring to FIG. 3, the controller 23 of the cloud server 20 determines that display of the document list is requested in step S415, and the controller 23 downloads a document list in step S420. The document list includes the data indicating the volume of each document. The controller 34 of the mobile information terminal 30 waits for the document list data to be received in step S515. When the document list data is received, the controller 34 causes the touch display 32 to display a document list with a color-coding depending on the volume in step S520. The color-coding depending on the volume refers to color coding to indicate whether or not the mobile information terminal 30 has sufficient storage capacity to download the data of each document.

For example, when sufficient space is available to download a document, the document is displayed in blue, whereas when insufficient space is available to download a document, the document is displayed in red. These colors are examples, and whether or not a document is downloadable may also be displayed by either "OK" or "No good", or the like. In step S525, the controller 34 waits for the user to select an instruction. When, an instruction is selected, in a case in which the color coding described above indicates that downloading is possible, the document is determined as downloadable in step S530, and the document data is downloaded in step S535. The downloaded document data is suitably processed by, for example, being displayed on the touch display 32, or the like.

In this manner, when the mobile information terminal 30 captures the image of a two-dimensional code that enables access to document data stored in the storage 22 of the cloud server 20 and displayed on the operation panel 13 of the multifunction printer 10, which is an image forming device that has an imaging section, such as a camera (steps S500 and S505), the access section, which is the communication section 33, accesses document data stored in the storage 22 of the cloud server 20 in accordance with the captured two-dimensional code (step S510) and obtains the volume of the document data stored in the storage 22 of the cloud server 20, and the volume determination section, which is the controller 34, determines whether or not the document data is downloadable and storable (step S515, or the like). Further, the display section, which is the touch display 32, displays the document data stored in the storage 22 of the cloud server 20 with the information on whether or not the document data is downloadable (step S520). Then, when the mobile information terminal 30 receives an input operation instructing download (step S525), in a case in which the volume determination section determines that the document data is downloadable and storable (step S530), the document data acquisition section, which is the controller 34 and the communication section 33, downloads and stores the document data (step S535).

On the other hand, when the color coding described above indicates that downloading is not possible, the controller 34 determines that the document data is not downloadable in step S540. In this case, the controller 34 determines whether or not a print option is selected in step S545. A print option is an option to cause the multifunction printer 10 to print the document data when the document data is not downloadable. When the print option is selected, the controller 34 causes the user to select a printer to be used for printing in step S550. Next, the controller 34 causes the printer to download the document data in step S555 and instructs the printer to print the document in step S560.

In this way, the processing of steps S545 to S560 corresponds to the print instruction controller that sends an instruction to the cloud server 20 to cause the document data to be downloaded and printed by the multifunction printer 10 which is an image forming device. In response to this, in the multifunction printer 10, the controller 15 waits for an instruction from the cloud server 20 in step S615. When an instruction to download is received, the controller 15 downloads the document data in step S620 and prints the document in step S625.

In this manner, the processing of steps S615 to S620 corresponds to the processing in which when document data stored in the storage 22 of the cloud server 20 is specified via the communication section 14, the controller 15 obtains document data stored in the storage 22 of the cloud server 20 and causes the print section 12 to print the document.

In this regard, it is needless to say that the present disclosure is not limited to the embodiments described above. For example, it is obvious that the present disclosure is able to be taken as a device disclosure or a method disclosure. Also, it is possible to take the present disclosure as a non-transitory computer-readable storage medium storing a program, the program causing the controller of the device to perform the processing in accordance with a predetermined procedure (for example, a disclosure of an image forming program). Further, the following are obviously included in the embodiments of the present disclosure for those skilled in the art.

It is possible to apply the present disclosure by suitably changing the combination of the members and the components disclosed in the embodiments, which are mutually replaceable, and the like.

It is possible to apply the present disclosure by suitably replacing the members and the components that are not disclosed in the embodiments but are publicly known techniques with mutually replaceable disclosed members and components, and the like, and the combination thereof It is possible for those skilled in the art to apply the present disclosure by suitably replacing the disclosed members and components, and the like, with members and components that are not disclosed in the embodiments but are assumed to be suitable substitutes by using publicly known techniques, and the like, and the combination thereof.

What is claimed is:

1. An image forming device comprising:
a scanner section;
a print section;
an operation panel configured to display and receive an input operation;
a communication section configured to communicate with an external cloud server; and
a controller, wherein
the controller performs a first step in which the controller transmits document data scanned by using the scanner section to the cloud server and causes the cloud server to store the document data in storage in accordance with an operation performed on the operation panel,
the controller performs a second step in which the controller creates a scan log identifying the document data kept in the storage of the cloud server after the first step,
when the document data is specified in accordance with the scan log in accordance with an operation performed on the operation panel, the controller displays a two-dimensional code that enables access to the document data stored in the storage of the cloud server after the second step, and
the controller automatically displays the two-dimensional code upon completion of the second step.

2. The image forming device according to claim 1, wherein
the controller includes information indicating a location of the document data stored in the storage of the cloud server as contents of the two-dimensional code.

3. The image forming device according to claim 1, wherein
the controller obtains data identifying the document data stored in the storage of the cloud server in accordance with an operation performed on the operation panel, and
displays a list of the data identifying the obtained document data on the operation panel.

4. The image forming device according to claim 1, wherein
when the document data kept in the storage of the cloud server is specified via the communication section, the controller obtains the document data stored in the storage of the cloud server and causes the print section to print the document data.

5. A cloud-based document system comprising:
the image forming device according to claim 1; and
a mobile information terminal including
an imaging section configured to capture an image of a two-dimensional code displayed on the operation panel of the image forming device and enabling access to the document data stored in the storage of the cloud server,
an access section configured to access the document data stored in the storage of the cloud server in accordance with the captured image of the two-dimensional code, a touch display configured to display information indicating whether or not the mobile information terminal has a storage capacity to download the document data, and a print instruction controller configured to instruct the cloud server to download the document data to the image forming device and to print the document data.

6. A non-transitory computer-readable storage medium storing an image forming program of an image forming device including a scanner section, a print section, an operation panel configured to display and receive an input operation, a communication section configured to communicate with an external cloud server, and a controller, the image forming program causing the controller to perform functions comprising:

performing a first step of transmitting document data scanned by using the scanner section in accordance with an operation performed on the operation panel to the cloud server and causing the cloud server to store the document data in storage; and performing a second step of creating a scan log identifying the document data kept in the storage of the cloud server after the first step, wherein when the document data is specified in accordance with the scan log in accordance with an operation performed on the operation panel, displaying a two-dimensional code enabling access to the document data stored in the storage of the cloud server after the second step, and automatically displaying the two-dimensional code upon completion of the second step.

* * * * *